United States Patent [19]

Ladwig

[11] Patent Number: 5,386,978
[45] Date of Patent: Feb. 7, 1995

[54] CUTTING BOARD

[76] Inventor: Todd O. Ladwig, 5985 Afton Rd., Excelsior, Minn. 55331

[21] Appl. No.: 49,325

[22] Filed: Apr. 21, 1993

[51] Int. Cl.⁶ .............................................. A47J 43/00
[52] U.S. Cl. ................................ 269/289 R; 269/302.1
[58] Field of Search ................ 269/302.1, 289 R, 13, 269/15, 303, 315

[56] References Cited

U.S. PATENT DOCUMENTS

| | | |
|---|---|---|
| 1,403,883 | 1/1922 | Woods . |
| 1,776,961 | 9/1930 | Vielbig . |
| 2,609,024 | 9/1952 | Russ . |
| 2,778,324 | 1/1967 | Mattson . |
| 2,935,107 | 5/1960 | Bertelsen et al. . |
| 3,734,486 | 5/1973 | Peacey . |
| 4,065,115 | 12/1977 | Popeil et al. ........................ 269/16 |
| 4,077,685 | 3/1978 | Scire et al. . |
| 4,440,385 | 4/1984 | Kingery . |
| 4,447,051 | 5/1984 | Price . |
| 4,531,260 | 7/1985 | Klamm . |
| 4,940,067 | 7/1990 | Beard ................................. 269/79 |
| 5,100,115 | 3/1992 | Schorn ........................... 269/302.1 |
| 5,121,909 | 6/1992 | Stickel ........................... 269/289 R |
| 5,203,548 | 4/1993 | Sanders ......................... 269/289 R |

Primary Examiner—Robert C. Watson
Attorney, Agent, or Firm—Hugh D. Jaeger

[57] ABSTRACT

A cutting board which is substantially rectangular in shape and made of a polymer material such as polyethylene. The cutting board includes a handle at one end, and an inner groove surrounding three of the edges and the handle on an upper portion of the cutting board. A living hinge extends across a lower portion of the cutting board to provide for movement of the lower portion of the cutting board. The movement or the lower portion of the cutting board is particularly useful for sweeping cut objects, such as vegetables, meats or other objects into a bowl or a pan. An alternative embodiment discloses a locking tab for fixing the upper and lower rectangular portion with respect to each other.

1 Claim, 5 Drawing Sheets

CUTTING BOARD

CROSS REFERENCES TO CO-PENDING APPLICATIONS

This application relates to a design patent application, U.S. Ser. No. 29/004,557, filed Feb. 8, 1993, entitled "Cutting Board" to the same applicant.

BACKGROUND OF THE INVENTION

1. Field of the Invention

The present invention relates to cutting boards for the preparation of food, and more particularly, pertains to a cutting board with a living hinge.

2. Description of the Prior Art

Cutting boards in the past have usually been flat wood or flat polymer members. There has been no provision for the sweeping or knifing of prepared food into a bowl or pan.

The present invention overcomes the disadvantages of the prior art by providing a cutting board with a living hinge to form a V trough or a back board for the sweeping or knifing of food into a bowl or pan.

SUMMARY OF THE INVENTION

The general purpose of the present invention is a cutting board with a living hinge, where the living hinge is positioned in a lower portion of the cutting board to provide for movement of the lower portion of the cutting board with respect to the upper portion of the cutting board forming either a trough or a back stop. This trough or back stop provides for the knifing or sweeping of cut objects into a container.

According to one embodiment of the present invention, there is provided a cutting board of a substantially rectangular shape with a handle in an upper portion, opposing inner grooves partially surrounding the three edges and the handle, and a living hinge in a lower portion of the cutting board. The living hinge provides for movement of the lower portion of the cutting board with respect to the upper portion of the cutting board.

According to an alternative embodiment, there is included a locking tab which rotates about a living hinge to facilitate locking of the upper and lower rectangular portions with respect to each other.

Significant aspects and features of the present invention include a cutting board which is of a polymer material, such as polyethylene and which is dishwasher usable and microwave usable.

Another significant aspect and feature of the present invention is a cutting board with a living hinge which provides for rotation of the lower portion of the cutting board with respect to the upper portion of the cutting board forming a trough or back stop for the sweeping, knifing or spooning of prepared cut objects into a container, such as a jar, bowl, pan, or any other object.

Another significant aspect and feature of the present invention is a locking tab for fixation of the upper rectangular portion of the cutting board with the lower rectangular portion.

Having thus described the embodiments of present invention, it is one object to provide a cutting board with a living hinge.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
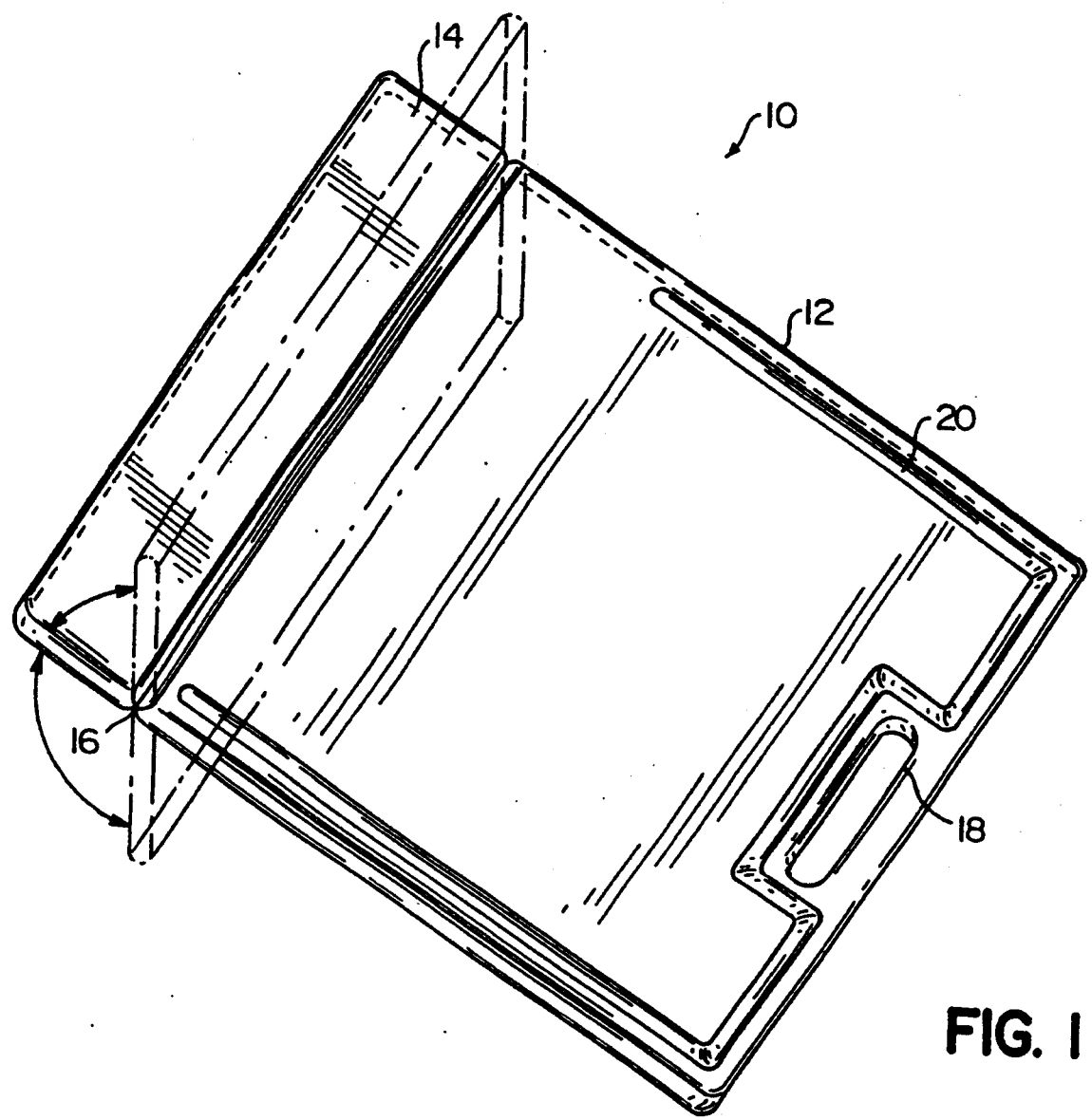
FIG. 1 illustrates a perspective view of a cutting board, the present invention.

FIG. 1 illustrates a cutting board 10 which is substantially rectangular, including an upper rectangular portion 12, and lower rectangular portion 14, where the two rectangular portions are divided by a living hinge 16. The cutting board 10 is constructed of polyolefin material, or in the alternative can be made of polypropylene, polyethylene or other suitable material. A handle 18 is provided in the upper rectangular portion 12. An inner groove 20 partially surrounds the three edges and the handle of the upper rectangular portion 12. A corresponding inner groove 22 opposes groove 20 on the opposing sides of the upper rectangular portion 14. The lower rectangular portion 14 actually rotates with respect to the upper rectangular portion 12, as illustrated in the figure. The lower rectangular portion 14 forms a trough or back stop with respect to the upper rectangular portion depending upon the degree of axial rotation about the living hinge 16.

Figure 2:
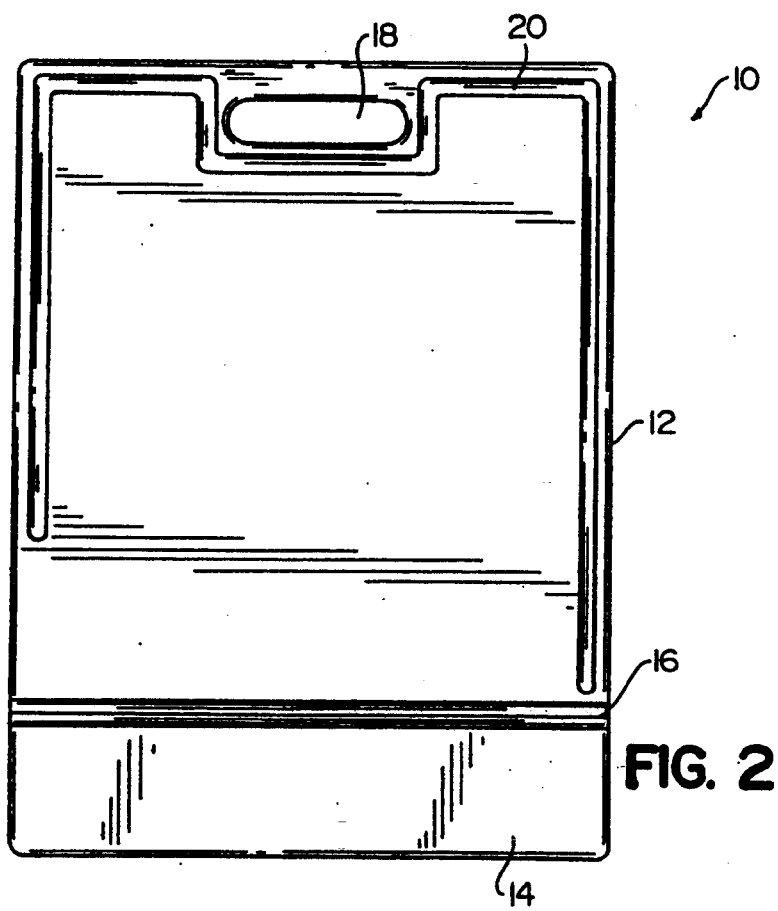
FIG. 2 illustrates a front view thereof.

FIG. 2 illustrates a front view of the cutting board 10 where all numerals correspond to those elements previously described.

Figure 3:
FIG. 3 illustrates a left side view thereof.

FIG. 3 illustrates a left side view of the cutting board 10 where all numerals correspond to those elements previously described.

Figure 4:
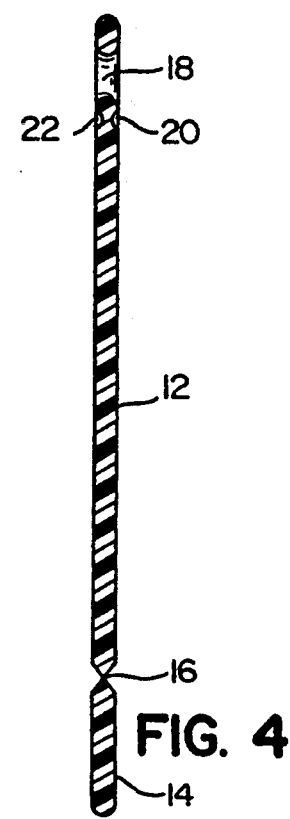
FIG. 4 illustrates a right side view in cross section thereof.

FIG. 4 illustrates a right side view in cross section of the cutting board 10 where all numerals correspond to those elements previously described. Illustrated in particular are the grooves 20 and 22 in opposition on opposing sides of the upper rectangular portion 12.

Figure 5:
FIG. 5 illustrates a top view thereof.

FIG. 5 illustrates a top view of the cutting board 10 where all numerals correspond to those elements previously described.

Figure 6:
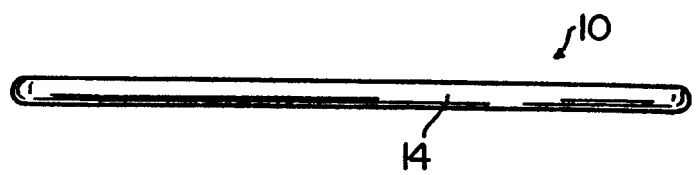
FIG. 6 illustrates a bottom view thereof.

FIG. 6 illustrates a bottom view of the cutting board 10 where all numerals correspond to those elements previously described.

Figure 7:
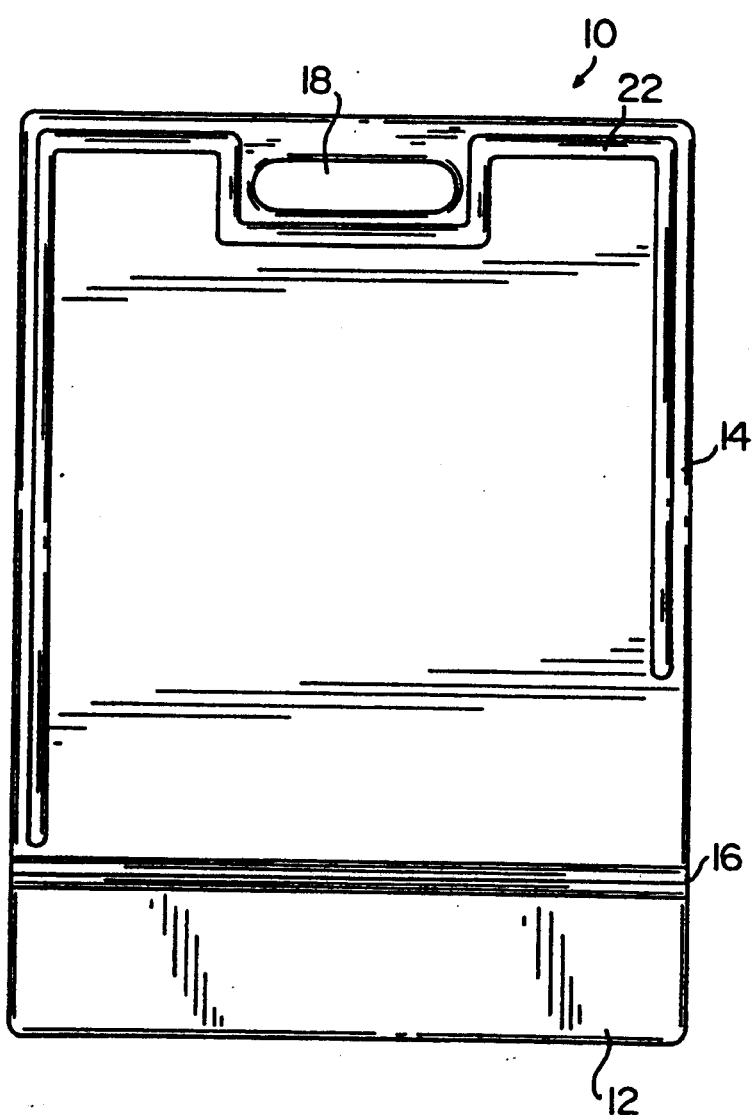
FIG. 7 illustrates a back view thereof.

FIG. 7 illustrates a back view of the cutting board 10 where all numerals correspond to those elements previously described. Also illustrated is a groove 22 corresponding to groove 20 on the opposing side of the upper planar portion 14.

DESCRIPTION OF THE ALTERNATIVE EMBODIMENT

Figure 8:
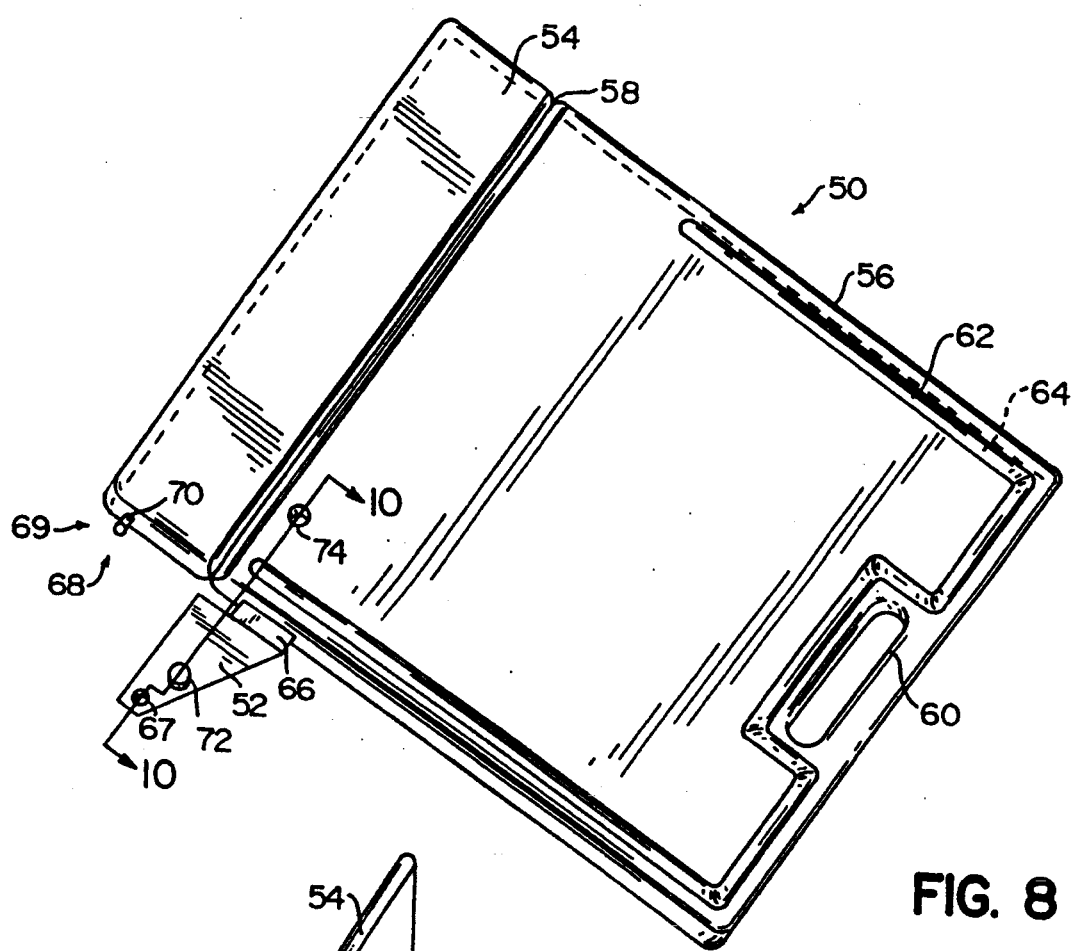
FIG. 8, an alternative embodiment, illustrates a perspective view of a cutting board having a locking tab.

FIG. 8, an alternative embodiment, illustrates a cutting board 50 similar to cutting board 10, but also including a locking tab 52 and associated components for locking the lower rectangular portion 54 with respect to the upper rectangular portion 56. Also included is a living hinge 58 between the lower and upper rectangular portions 54 and 56, a handle 60 located in the upper rectangular portion 56 and continuous grooves 62 and 64 opposing each other on opposing surfaces of the upper rectangular portion 56. The positionable locking tab 52 rotates about an integrally molded living hinge 66 extending from an edge of the upper rectangular portion 56 and includes a hole 67 for engagement with a locking post 68 extending from an edge of the lower rectangular portion 54 having a head 69 whose radius is larger than the main shaft 70 of the locking post. A locking post 72 extends vertically from the positionable locking tab 52 for subsequent frictional engagement with a hole 74 in the upper rectangular portion 56 for storage of the locking tab 52 against the surface of the upper rectangular portion 56 when not in use.

Figure 9:
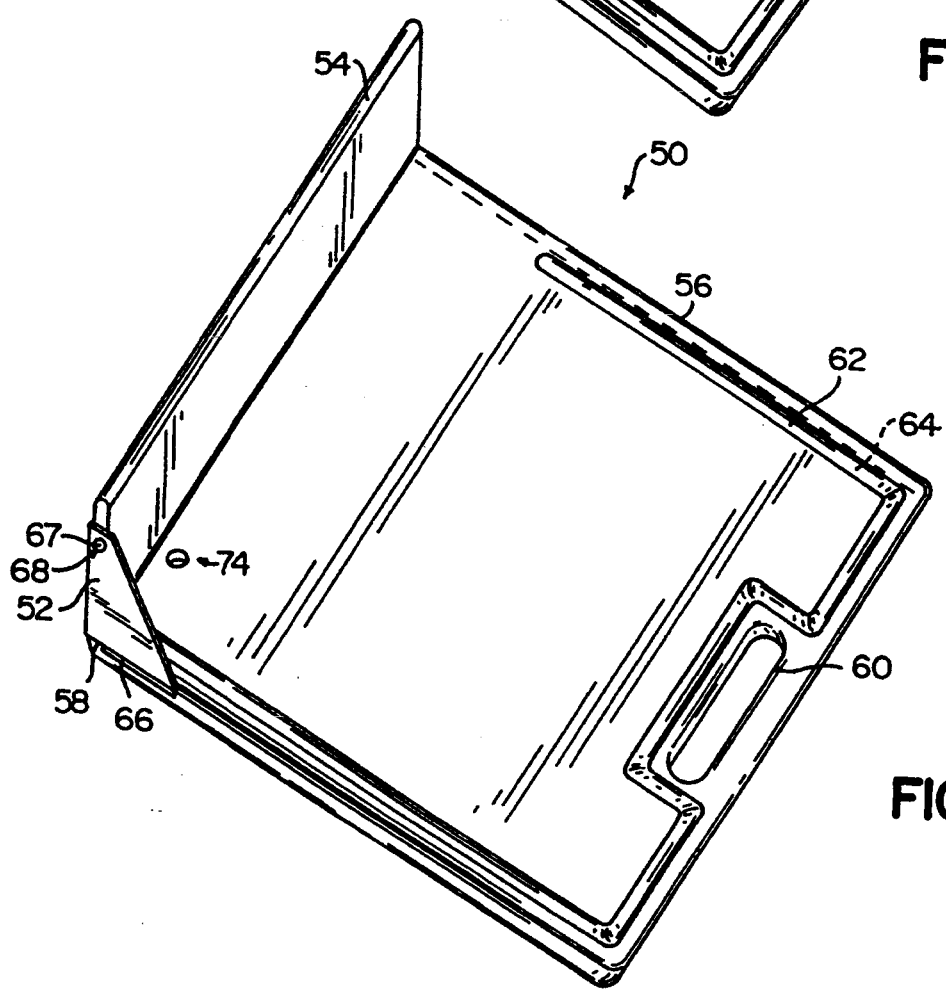
FIG. 9 illustrates the upper and lower rectangular portions locked with respect to each other; and, FIG. 10 illustrates a cross-sectional view along line 10—10 of FIG. 9.

FIG. 9 illustrates the lower portion 54 locked with respect to the upper portion 56 by the locking tab 52, thus causing the trough formed between the upper and lower rectangular portions 56 and 54 to be fixed. Fixation provides for ease of operation and would only require one hand to dispose of sliced items from the cutting board 50. In the alternative, the lower rectangular portion 54 could be rotated 180° from that position illustrated and locked in place to form a leg, thereby causing the upper surface 56 to be inclined with respect to the surface upon which it rests. Thus, items cut or sliced on the inclined surface would tend to fall away from the item being cut, thereby providing an uncluttered surface in the vicinity of the cutting or slicing action.

Figure 10:
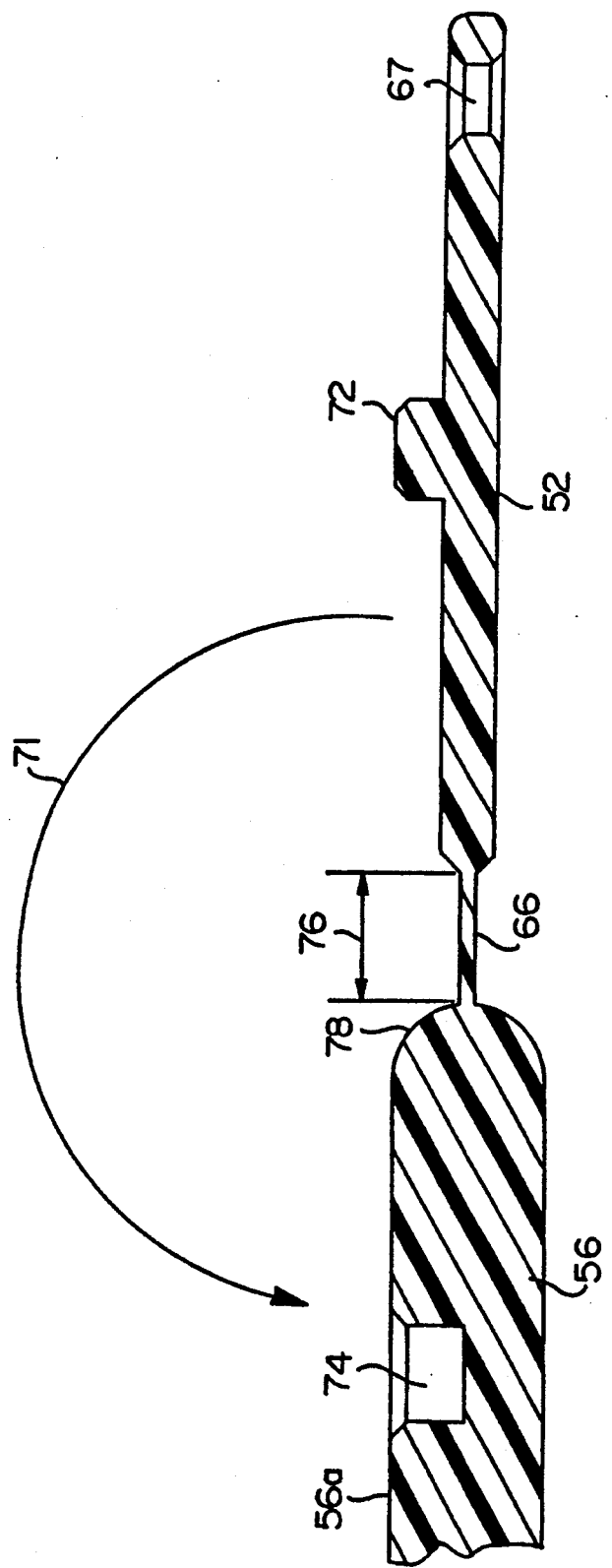

FIG. 10 illustrates a sectional view along line 10—10 of FIG. 9. Illustrated in particular is the living hinge 66 about which the locking tab 52 and the upper rectangular portion 56 bends as indicated by arrow 71. The living hinge 66 has a thickness of 0.015 inches for purpose of illustration and example, and is not considered to be limiting to the scope of the invention. The living hinge 66 is of sufficient dimensional width 76 to allow the hinge to sufficiently and easily bend about the radiused member 78 so that the locking tab 52 may be stored flat against the upper surface 56a of the upper rectangular portion 56. The width 76 of the living hinge 66, in addition, allows sufficient flexibility along and about the living hinge 66 to allow the beveled locking post 72 to readily and easily align with and frictionally engage the beveled hole 74 in the upper rectangular portion 56 for securation and storage. It is also noted in the illustration that hole 67 is beveled at its upper and lower edges.

MODE OF OPERATION

The cutting board 10 is utilized as a cutting, chopping or other culinary surface. After objects such as foods, vegetables or meats have been prepared, such as cut, chopped or otherwise, the lower rectangular portion 14 can be rotated with respect to the upper rectangular portion 12 to form either a trough or groove for the sweeping, knifing or spooning of the prepared food into a container such as a jar, bowl, pan or otherwise. The degree of rotation is one's preference for the specific food and the specific spooning, sweeping or otherwise for the cutting board.

In the alternative, the upper and lower rectangular portions can be locked with respect to each other by use of a locking tab.

Various modifications can be made to the present invention without departing from the apparent scope hereof.

I claim:
1. A cutting board comprising:
   a. a rectangular member;
   b. said rectangular member including an upper portion;
   c. a lower portion;
   d. a living hinge therebetween wherein said lower portion is of a smaller surface area than said upper portion;
   e. having a locking tab operated about a living hinge for locking of said upper and lower rectangular portions with respect to each other; and,
   f. said lower rectangular portion can be locked by said locking tab to said upper rectangular portion to provide a slanted cutting surface.

* * * * *